(12) United States Patent
Cox et al.

(10) Patent No.: US 6,775,652 B1
(45) Date of Patent: *Aug. 10, 2004

(54) SPEECH RECOGNITION OVER LOSSY TRANSMISSION SYSTEMS

(75) Inventors: Richard Vandervoort Cox, New Providence, NJ (US); Stephen Michael Marcus, Morristown, NJ (US); Mazin G. Rahim, Matawan, NJ (US); Nambirajan Seshadri, Chatham, NJ (US); Robert Douglas Sharp, Morristown, NJ (US)

(73) Assignee: AT&T Corp., New York, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/107,784

(22) Filed: Jun. 30, 1998

(Under 37 CFR 1.47)

(51) Int. Cl.[7] ............................................. G10L 15/28
(52) U.S. Cl. .................................... 704/236; 704/270.1
(58) Field of Search ............................. 704/236, 243, 704/270.1

(56) References Cited

U.S. PATENT DOCUMENTS

| | | | | |
|---|---|---|---|---|
| 4,897,878 A | * | 1/1990 | Boll et al. .................... 704/233 |
| 5,010,553 A | * | 4/1991 | Scheller et al. ............. 714/751 |
| 5,390,278 A | | 2/1995 | Gupta et al. ................ 704/243 |
| 5,425,129 A | | 6/1995 | Garman et al. ............. 704/256 |
| 5,440,584 A | | 8/1995 | Wiese ........................ 375/242 |
| 5,471,521 A | * | 11/1995 | Minakami et al. ....... 379/88.13 |
| 5,481,312 A | | 1/1996 | Cash et al. ............ 375/240.28 |
| 5,550,543 A | | 8/1996 | Chen et al. ................... 341/94 |
| 5,555,344 A | | 9/1996 | Zunkler ....................... 704/242 |
| 5,574,825 A | | 11/1996 | Chen et al. .................. 704/228 |
| 5,617,423 A | * | 4/1997 | Li et al. ...................... 370/426 |
| 5,617,541 A | | 4/1997 | Albanese et al. ........... 709/207 |
| 5,768,527 A | * | 6/1998 | Zhu et al. ................... 709/231 |

OTHER PUBLICATIONS

Hynek Hermansky, Sangita Tibrewaia, and Misha Paval, "Towards ASR on Partially Corrupted Speech," Proc. IEEE Int. Conf. of Speech and Language Proc. ICSLP 96, pp. 462–465, Oct. 1996.*

Morris, A.C., Cooke M. P., and Green, P. D., "Some Solution to the Missing Feature Problem in Data Classification, with Application to Noise Robust ASR," Proc. 1998 IEEE Int. Conf. on Acoust, Speech, and Sig, Proc., vol. 2, pp. 737–74–, 12–15 May 1998.*

P.D. Green et al., *Auditory Scene Analysis and Hidden Markov Model Recognition of Speech in Noise*, Proceedings of ICASSP '95, pp. 401–404 (IEEE 1995).

* cited by examiner

*Primary Examiner*—Richemond Dorvil
*Assistant Examiner*—Donald L. Storm

(57) ABSTRACT

Recognizing a stream of speech received as speech vectors over a lossy communications link includes constructing for a speech recognizer a series of speech vectors from packets received over a lossy packetized transmission link, wherein some of the packets associated with each speech vector are lost or corrupted during transmission. Each constructed speech vector is multi-dimensional and includes associated features. Potentially corrupted features within the speech vector are indicated to the speech recognizer when present. Speech recognition is attempted at the speech recognizer on the speech vectors when corrupted features are present. This recognition may be based only on certain or valid features within each speech vector. Retransmission of a missing or corrupted packet is requested when corrupted values are indicated by the indicating step and when the attempted recognition step fails.

35 Claims, 6 Drawing Sheets

SPEECH RECOGNITION OVER LOSSY TRANSMISSION SYSTEMS

FIELD OF THE INVENTION

The present invention relates to speech recognition methods. In particular, the invention relates to speech recognition where speech data is transmitted and received over a lossy or corrupted communication link.

BACKGROUND OF THE INVENTION

Speech recognition has traditionally been performed using systems in which the transmission of speech data within the system is free of errors. However, the emergence of the Internet and of digital wireless technology has given rise to situations where this is no longer the case. In applications where speech is sampled and partially processed on one device and then packetized and transmitted over a digital network for further analysis on another, packets of speech data may be delayed, lost or corrupted during transmission.

This is a serious problem for current speech recognition technologies, which require data to be present even if it has additive noise. Existing Internet protocols for error free data transmission such as TCPIP are not suitable for interactive ASR ("Automatic Speech Recognition") systems, as the retry mechanisms introduce variable and unpredictably long delays into the system under poor network conditions. In another approach, real time delivery of data packets is attempted, ignoring missing data in order to avoid introducing delays in transmission. This is catastrophic for current recognition algorithms as stated above.

It would be desirable to have a class of recognition algorithms and transmission protocols intermediate the conventional protocols which are able to operate robustly and with minimal delays or incomplete speech data under poor network conditions. Ideally, the protocol would have a mechanism by which loss and delay may be traded off, either in a fixed manner or dynamically, in order to optimize speech recognition over lossy digital networks, for example in a client-server environment.

SUMMARY OF THE INVENTION

A system and method according to the present invention provide speech recognition on speech vectors received in a plurality of packets over a lossy network or communications link. Typically, the recognition occurs at a server on speech vectors received from a client computer over the network or link. The system and method are able to operate robustly, despite packet loss or corruption during transmission. In addition, the system and method may dynamically adjust the manner in which packets are being transmitted over the lossy communications link to adjust for varying or degraded network conditions.

The method includes constructing for a speech recognizer multidimensional speech vectors which have features derived from a plurality of packets received over a lossy communications link. Some of the packets associated with each speech vector are missing or corrupted, resulting in potentially corrupted features within the speech vector. These potentially corrupted features are indicated to the speech recognizer when present. Speech recognition is then attempted by the speech recognizer on the speech vectors. If speech recognition is unsuccessful, a request for retransmission of a missing or corrupted packet is made over the lossy communications link when potentially corrupted features are present in the speech vectors.

The system for recognizing a stream of speech received as a plurality of speech vectors over a lossy communications link comprises a buffering and decoding unit coupled to the lossy communications link. The buffering and decoding unit receives a plurality of packets, identifies missing or corrupted packets, and constructs a series of speech vectors from the received packets. Each speech vector has a plurality of certain features and uncertain features. A speech recognizer is coupled to the buffering and decoding unit and classifies each speech vector as one of a plurality of stored recognition models based on only the certain features within the speech vector.

The system and method may include a capability to request retransmission of lost or corrupted packets or bandwidth renegotiation from a source of the packets over the lossy communications link. The renegotiation may include, for example, a request to include error correction or detection bits in the packets, a request to compress the packets prior to transmission, or a request to: discard less salient components of the signal to reduce bandwidth requirements, for example, by performing principle components analysis on speech data prior to packetization.

BRIEF DESCRIPTION OF THE DRAWINGS

The features and advantages of the present invention are described more completely with reference to the appended figures and detailed description.

DETAILED DESCRIPTION OF THE INVENTION

Figure 1:
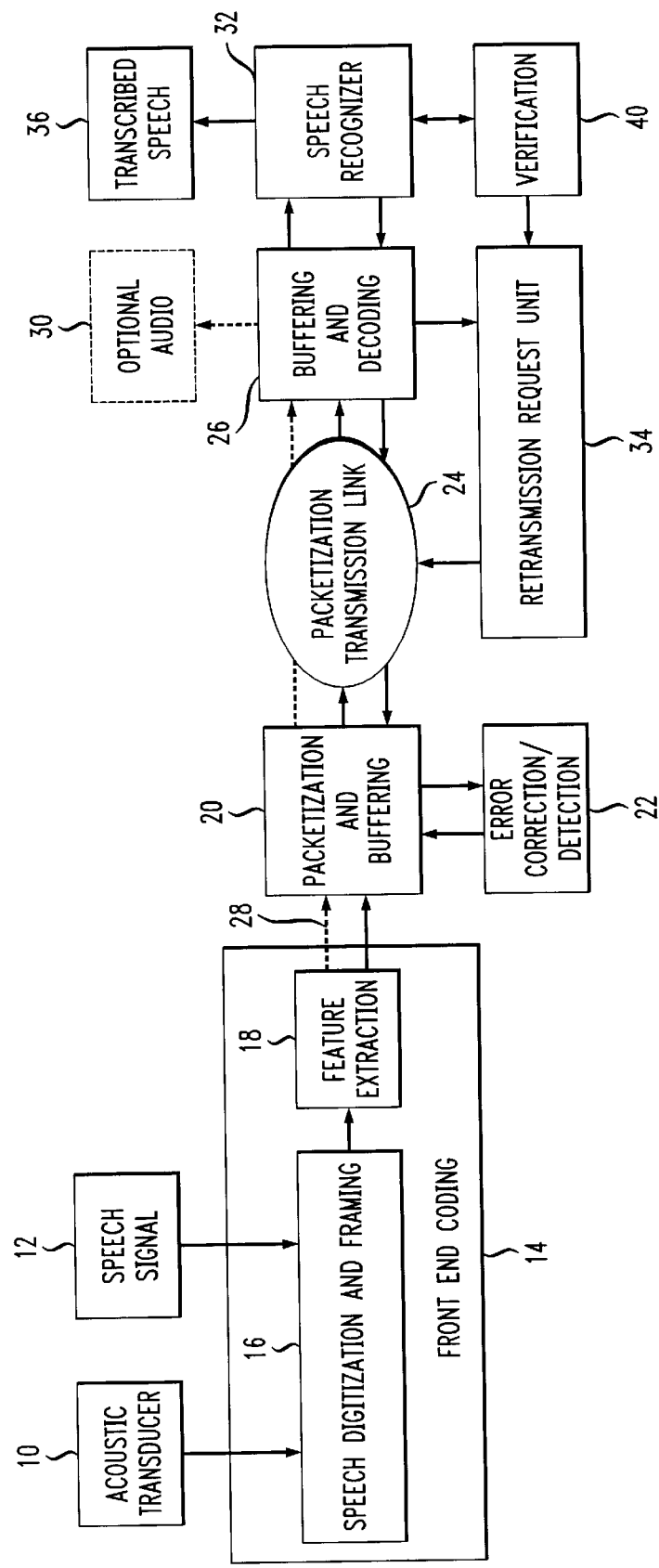
FIG. 1 displays a speech recognition system wherein speech is coded, packetized and transmitted to a speech recognizer over a packetized transmission link according to the present invention.
Figure 2:
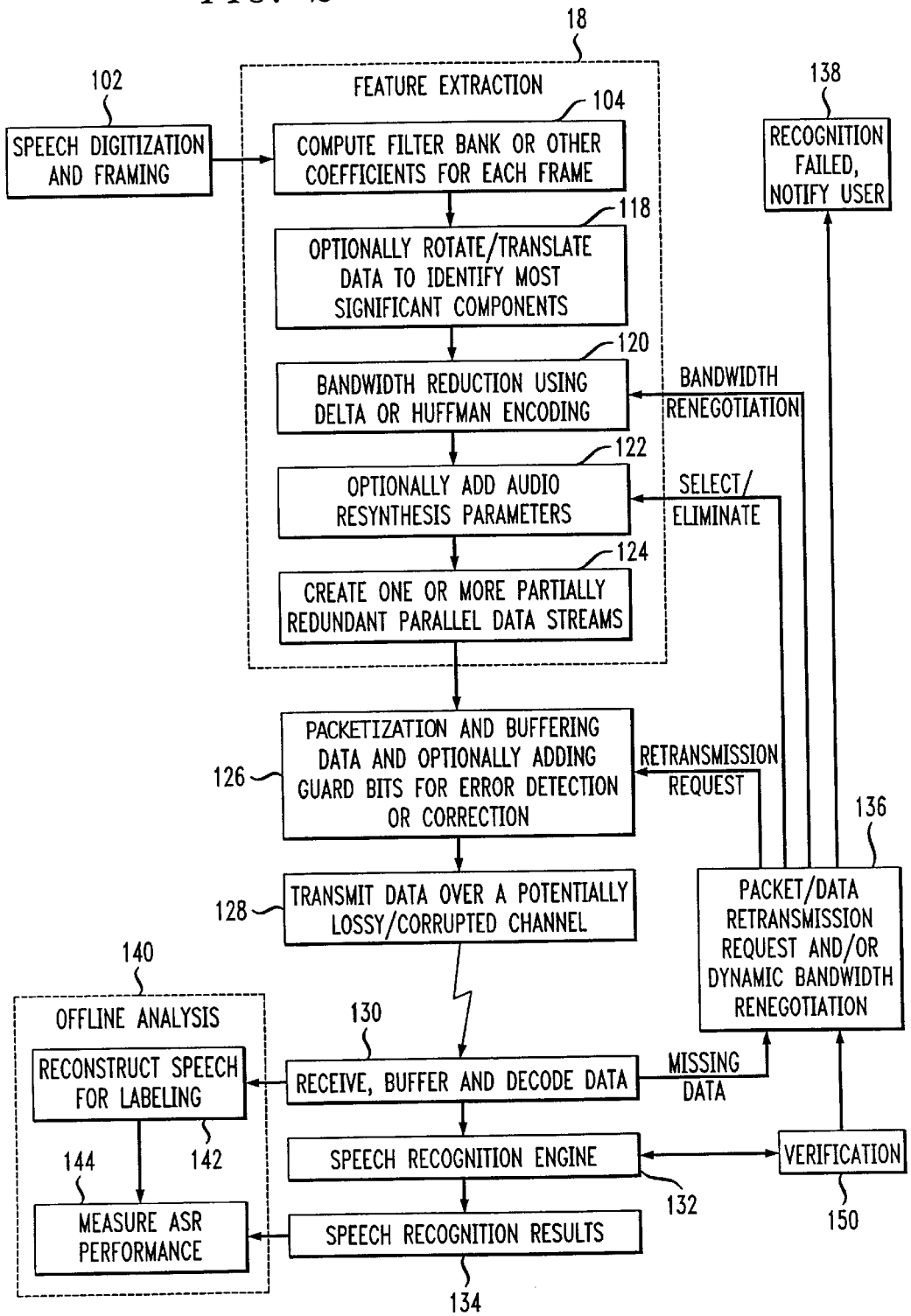
FIG. 2 depicts a method according to the present invention of coding, packetizing, transmitting, and recognizing speech over a lossy transmission system.

FIG. 1 shows a preferred system for transmitting packetized speech data over a lossy transmission link to a speech recognizer. A front end coding unit 14 is coupled to an acoustic transducer 10 and/or a speech signal 12. The acoustic transducer 10 converts speech waveforms into electrical signals for processing. Alternatively, the speech signal 12 may be sent directly into the front end coding unit 14 without the intermediate step of converting the speech using conventional techniques. An acoustic transducer is typically a microphone. The front end coding unit 14 includes a speech digitization and framing unit 16 which is coupled to the acoustic transducer 10 and to the speech signal 12. The front end coding unit 14 also includes a feature extraction unit 18 which is coupled to the speech digitization and framing unit 16 as well as to the packetization and buffering unit 20. The speech digitization and framing unit 16 converts a speech signal from analog to digital data. In addition, the speech digitization and framing unit 16 continuously segments the speech signal into frames. The frames may be partially overlapping and are typically of 20 to 30 milliseconds duration. The digitized and framed data is then input into the feature extraction unit 18. This unit, described in more detail with reference to FIG. 2, is optimized to extract the most pertinent features from the framed speech signal to facilitate speech recognition. The output of the feature extraction unit 18 is coupled to the packetization and buffering unit 20.

The packetization and buffering unit 20 receives the framed speech data from the front end coding unit 14 and maps one or more frames into a single packet for transmission over the packetized transmission (or communications) link 24. The terms "transmission link" and "communications link" are used interchangeably and are intended to have the same meaning. Any number of frames may be mapped into a single packet using well known multiplexing techniques, however, conventionally three frames are stored in each packet. In a preferred embodiment of the invention, the frames are not stored sequentially in a packet. For example, frames 1, 2 and 3 are not placed in the same packet. Rather, frames 1, 4 and 7 are placed in a first packet, frames 2, 5, and 8 are placed in a second packet and frames 3, 6, and 9 are placed in a third packet. This reduces the likelihood of having adjacent frames lost when transmitted over a lossy packetized transmission link. The packetization and buffering unit 20 is coupled to an error correction/detection unit 22 and a packetized transmission link 24. The packetized transmission link 24 is typically "lossy" indicating that one or more packets of data may be lost or unduly delayed during transmission.

The packetized transmission link may be accomplished over a local area or a geographically dispersed area network of servers and/or telecommunications switches that are interconnected electrically, optically, or wirelessly, such as the Internet. Examples of packetized communication protocols suitable for use include Asynchronous Transfer Mode (ATM), X.25, TCP-IP, and ISDN. In one embodiment of the invention, packetized transmission link 24 represents the Internet and the TCP-IP protocol is used in packetizing and transmitting and decoding the data.

The error correction/detection unit 22 is used to add parity bits to the packetized data prior to transmission over the lossy packetized transmission link 24. In the case of error detection, the parity bits are used by conventional algorithms at the receiving end of the packetized transmission link to determine which bits were lost or corrupted during transmission. In the case of error correction, the parity bits are used not only to determine which bits were lost during transmission over the lossy packetized transmission link 24 but also to correct the lost or corrupted bits. Once the packets have been filled with the framed and digitized speech data from the front end coding unit 14 and have incorporated error detection/correction bits when desired, the packets are transmitted over the packetized transmission link 24.

Additionally, audio resynthesis parameters may be added and transmitted from the feature extraction unit 18 to the packetization and buffering unit 20 for transmission over the packetized transmission link 24. The audio resynthesis parameters are not used for speech recognition. Rather, the audio resynthesis parameters supplement the framed speech data and are used at the receiving end to resynthesize the original speech signal or a degraded version thereof. This may be used in order to facilitate ultimately comparing the output of a speech recognizer with a human transcription of the original speech.

Figure 4:
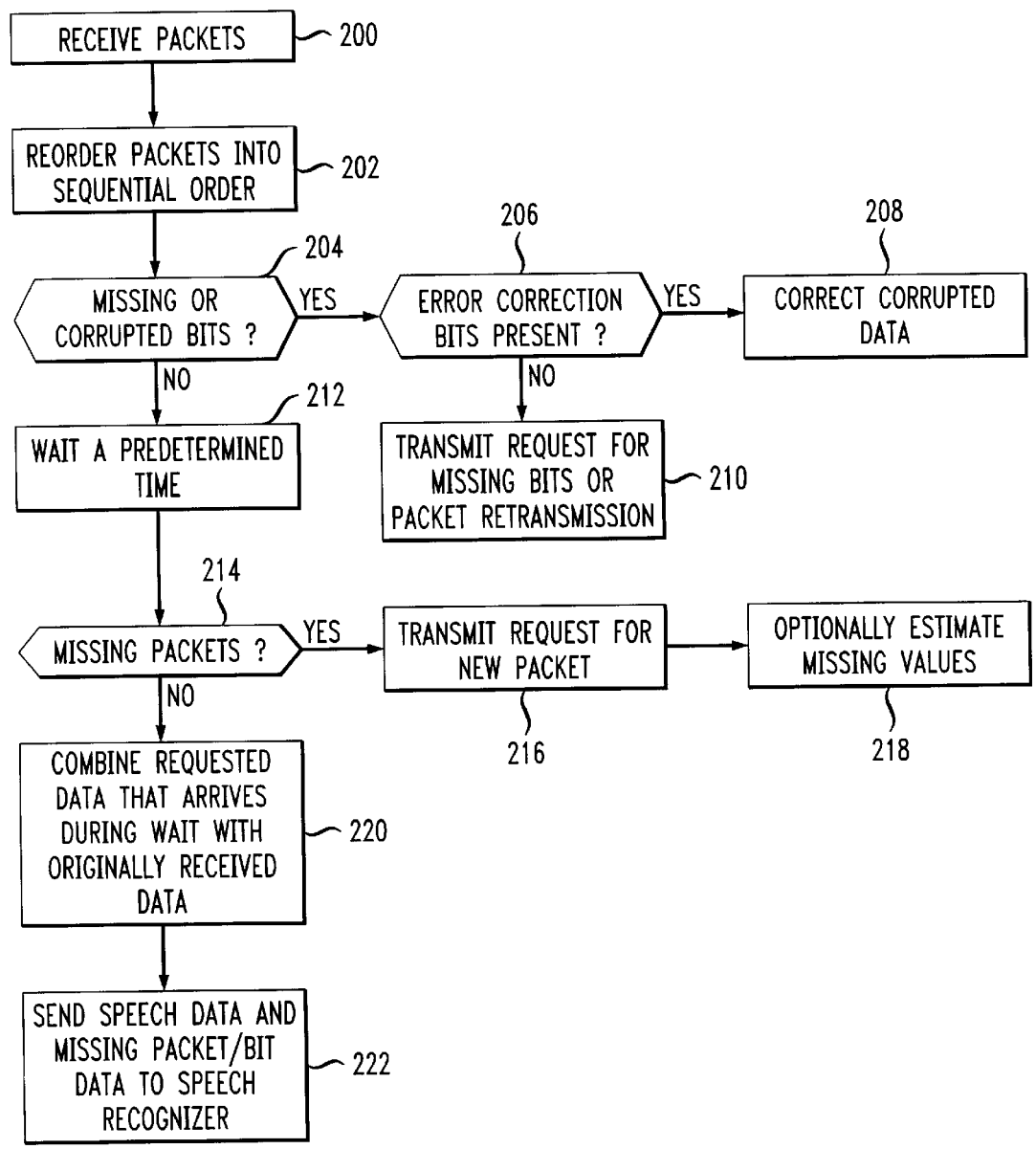
FIG. 4 depicts an expanded view of the buffering and decoding unit according to the present invention.

The packetized data is received from the packetized transmission link 24 at a buffering and decoding unit 26. This unit is remotely situated from the packetization and buffering unit 20. The buffering and decoding unit 26 receives packets and reorders them into sequential order. The unit also determines when there are missing packets and requests retransmission of lost packets. Additionally, the buffering and decoding unit determines whether there are missing or corrupted bits in a received packet. If so, and error correction is present, the bits are corrected. If only error detection is present, then a request for retransmission of the missing or corrupted bits may be made. The buffering and decoding unit 26 is described in greater detail with reference to the flow diagram of FIG. 4.

The buffering and decoding unit 26 is coupled to both retransmission request unit 34, the speech recognizer 32, and the optional audio unit 30. Any requests for retransmission are identified by the buffering and decoding unit 26 and are sent to the retransmission request unit 34 which in turn makes the request over the packetized transmission link to the packetization and buffering unit 20. The buffering and decoding unit 26 continuously receives packets and continuously requests missing packets and corrupted data. After a predetermined delay, the buffering and decoding unit 26 converts all available data that has been received into a speech vector. The speech vector is sent to the speech recognizer 32. In addition, data is sent to the speech recognizer 32 to indicate which bits, if any, among the speech vector contain uncertain values because of data corruption over the transmission link 24. This additional data is hereinafter referred to as corruption data.

Figure 5:
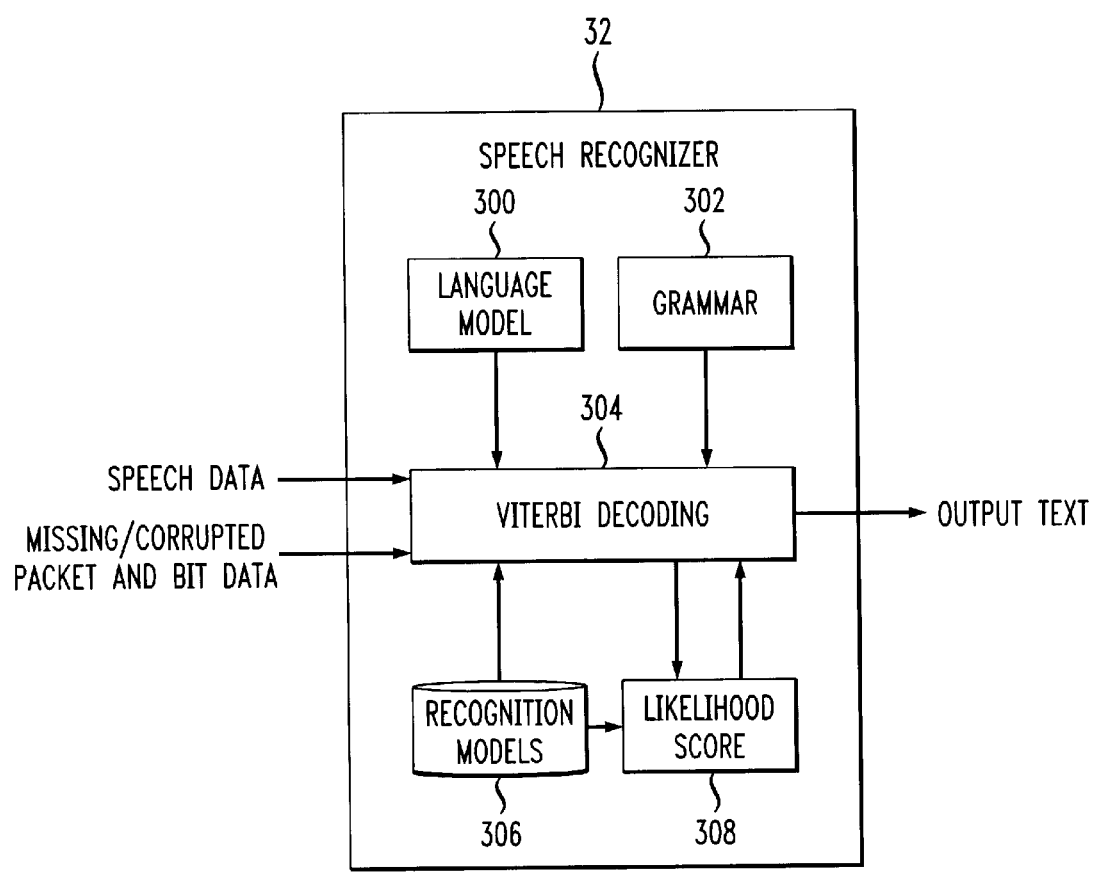
FIG. 5 depicts a speech recognizer according to the present invention.

The speech recognizer 32, coupled to the buffering and decoding unit 26 and the speech verification unit 40, produces transcribed speech 36. An expanded view of a preferred speech recognizer is depicted in FIG. 5. The speech recognizer 32 includes a Viterbi decoding unit 304 which receives input from a language model 300, a grammar unit 302 and recognition models stored in database 306. These components are well known in the art. In addition, the Viterbi decoding unit 304 is coupled in both the input and output directions to a likelihood score unit 308 which also receives input from a recognition model database 306. In operation, the Viterbi decoding unit 304 receives a sequence of speech vectors. The Viterbi decoding unit 304 compares features within each speech vector with each recognition model in database 306. When a speech vector includes missing or corrupted data bits, these bits are eliminated from the speech vector for purposes of the comparison. Then, a probability is determined that each speech vector belongs to or represents each model within the recognition model database 306.

Each recognition model represents a known speech pattern. A speech pattern may represent any sound, including a sound of a spoken language, a sound produced by one or more adjacent consonants or vowels, syllables, letters, words or phonemes, or other environmental sounds such as the sound made by a fan. Each speech vector within the sequence of received speech vectors is temporarily classified as a speech pattern corresponding to a recognition model based on the probability determined for each model. Typically, a speech vector will be temporarily classified as the speech pattern corresponding to the recognition model having the highest probability. However, in lieu of probability, a speech vector may be classified as the recognition model having the shortest "distance" to the speech vector. As multiple speech vectors are processed by the Viterbi decoding unit 304, one or more hypothetical classification streams are produced. A language model 300 and a grammar model 302 facilitate mapping the classification streams into words. The language model 300 includes all of the words known by the speech recognizer 32. The model correlates each word with one or more speech patterns which comprise each word. The language model 300 facilitates mapping the series of speech patterns within the hypothetical classification streams into one or more distinct words or sentences. The grammar model 302 includes rules which define which words or speech patterns are unlikely to follow each other in a given language. With input from the language model 300 and the grammar model 302, the Viterbi decoding unit 304 may reject one or several speech pattern classifications which individually have the highest probability of being correct in order to maximize the probability of correctly classifying a stream of speech patterns into words.

The likelihood score unit 308 generates a confidence level associated with each classification. In addition, the language model 300 and the grammar model 302 may generate a likelihood score for the Viterbi decoding unit 304. The Viterbi decoding unit 304 outputs one or more hypothetical speech classification streams and a confidence level associated with each classification stream to the verification unit 40. The confidence level reflects the likelihood scores input of the Viterbi decoding unit 304. When the confidence level of the classification is low and/or when there are missing or corrupted packets or bit data, the verification unit 40 can issue a request for retransmission to the retransmission request unit 34. In an alternate embodiment, the speech recognizer 32 can issue the request without the need of a verification unit 40. The output of the speech recognizers is a transcribed stream of speech 36. The verification unit may participate in selecting the transcribed stream of speech 36 from hypothetical classifications output by the speech recognizer. In addition, if audio speech resynthesis parameters were transmitted along with the packetized speech data, the audio resynthesis parameters together within the data used for speech recognition can be converted into a rendition of the original speech for comparison with the transcribed speech 36. The conversion is performed by the buffering and decoding unit 26.

The speech recognition system depicted in FIG. 1 is distributed across two or more computer systems separated by the packetized transmission link 24. In a typical configuration, a client computer is coupled to a server computer over the packetized transmission link 24. The client computer receives the speech signal, performs the front end coding, optional error correction/detection, and packetization. The server receives the packetized speech data and performs the buffering and decoding, speech recognition, and retransmission requests.

Figure 3:
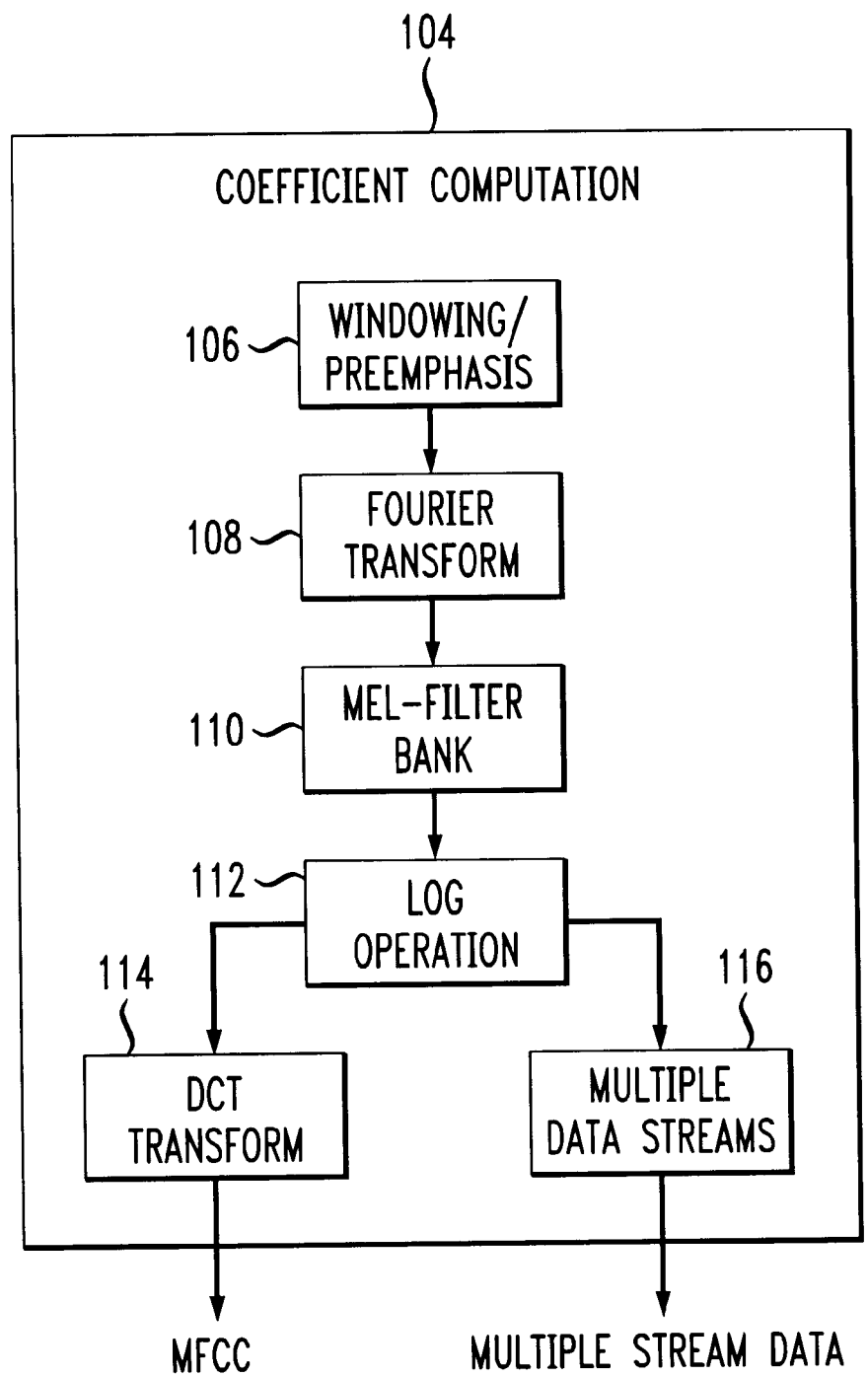
FIG. 3 depicts an expanded view of the filter bank computing step according to the present invention.

FIG. 2 illustrates a preferred method of transmitting and recognizing speech data in a client-server environment according to the present invention. In step 102, speech digitization and framing is performed on an input speech signal. Then in step 104, filter bank or other coefficients for each frame are computed. An expanded view of step 104 is illustrated in FIG. 3. In step 106 in FIG. 3, unwanted low and high frequency components are filtered from each frame. In addition, the amplitude of the desired frequency interval is boosted. In step 108, the time domain framed signal is converted into the frequency domain by the Fourier transform process. In step 110, the speech frames are run through a mel-filter bank. This introduces smoothing of the frequencies and helps to reduce pitch information contained within the signal. In step 112, the Fourier coefficients of the framed speech signals are converted into logarithmic coefficients. After step 112 in the preferred embodiment, either step 114 or 116 may be performed. In step 114, a DCT transform is performed. This results in converting the speech signal to a speech vector that has a smaller dimension. In addition, it produces features that are more mutually exclusive. This facilitates speech recognition which operates on means and variances. Variances are optimized when operating on uncorrelated or mutually exclusive data. In step 116, the framed data is encoded as multiple stream data which is decoded after transmission to produce the speech vector. The method also may be performed without steps 114 or 116.

Step 118 in FIG. 2 may optionally be performed to rotate or translate the data to order the data based on the informational significance of the speech data components used in speech recognition. One way of doing this is principle component analysis (PCA). By using PCA to identify the most significant or useful variables for purposes of speech recognition, more bandwidth can be allocated to transmitting these more valuable components, while those components judged to be less significant can be allocated less bandwidth. For example, the most significant informational portions of the framed speech data could be transmitted with more bits of error detection/correction or could be sent in the more than one packet.

In step 120, the framed speech data is optionally compressed using delta or Huffman encoding. Using delta encoding, only the changes between filter bank values in adjoining frames are transmitted rather than transmitting the actual data of each frame. This can reduce the bandwidth required for transmission of adjacent frames by more than half with no significant loss of resolution. Huffman encoding results in a further bandwidth reduction. Using Huffman encoding, a subsequent filter bank coefficient is predicted given a previous one. The most probable values of the next coefficient (given the current value) are assigned values which require fewer bits to transmit while the least probable values are assigned values requiring more bits. In addition to delta and Huffman encoding, any other common encoding scheme may be used in accordance with the present invention.

In step 122, audio resynthesis parameters may optionally be added. The audio resynthesis parameters are not used for speech recognition. Rather, the audio resynthesis parameters are used in combination with the packetized speech data in order to transmit a version of the speech itself over the packetized transmission link. The resynthesized speech parameters can then be used in conjunction with the speech data to reproduce the original speech signal, or a degraded version thereof still intelligible to a human user. This enables a user to compare the results of the speech recognition process with the reconstructed audio signal. In step 124, one or more partially redundant parallel data streams can be created for transmission over the packetized transmission link. Ideally the most significant components identified in optional step 118 are transmitted several times in packets separated in time to avoid loss at the receiving end while those parameters which were determined to be less significant are sent only once or never in low bandwidth conditions of the packetized transmission link. In step 126, the framed data or multiple stream data is packetized and buffered according to well known techniques and protocols. Optionally, guard bits for error detection or correction are added to each packet prior to transmission over the packetized transmission link as described above.

In step 128, the packetized data is transmitted over the transmission link. The transmission link is potentially lossy resulting in lost packets and/or corrupted bits within a packet. Frequently, the rate of transmission over the packetized transmission link in step 128 is much lower than the rate at which framed data arrives to be packetized in step 126. Under such circumstances, the incoming, framed data is packetized and then stored in a buffer prior to transmission in step 128. In step 130, the packetized data is received and buffered. In turn, the packetized data is decoded. Step 130, set forth in more detail in FIG. 4, will now be described.

In step 200, the packets are received. Then in step 202, the packets are reordered into sequential order. This is performed by analyzing a header within each packet. The header indicates a location within a sequence of packets. The reordering step is necessary because, during transmission over the transmission link, packets may take different routes through different nodes within the network. Thus, the packets need to be reassembled into a sequential order, because later transmitted packets might arrive before previously transmitted packets.

In step 204, the buffering and decoding unit 26 determines whether or not there are missing or corrupted bits. If so, in step 206, the buffering and decoding unit 26 determines whether error correction bits are present. If so, the corrupted data is corrected in step 208. If not, in step 210, a request for transmission of missing bits or packets is sent to the retransmission request unit 34. In turn, this request is sent over the packetized transmission link 24 to the packetization and buffering unit 20. The packetization and buffering unit 20 responds when it receives the request, typically based upon data that is presently stored within its buffer.

In step 212, the buffering and decoding unit waits a predetermined time period. The predetermined time is chosen in order to ensure a reasonable amount of time for receipt of all of the packets of data. This predetermined time interval may be initially chosen based upon assumptions about a typical packetized transmission link. Conversely, the predetermined time may be chosen dynamically based upon present network conditions. Ultimately, the predetermined time interval represents a trade off between recognizing speech in real time, and receiving error free data regardless of transmission time and delay. After waiting a predetermined time, in step 214, the buffering and decoding unit 26 determines whether or not there are missing packets. If so, in step 216, a request for a new packet is sent to the retransmission request unit 34. The retransmission request unit 34 then issues a request for a replacement packet over the packetized transmission link 24. Optionally in step 218, the buffering and decoding unit 26 can estimate the value stored within the missing packet based upon adjacent received packets or frames. If missing packets are requested, the buffering and decoding unit 26 may enter an additional wait state to give the request time to be fulfilled.

Figure 6:
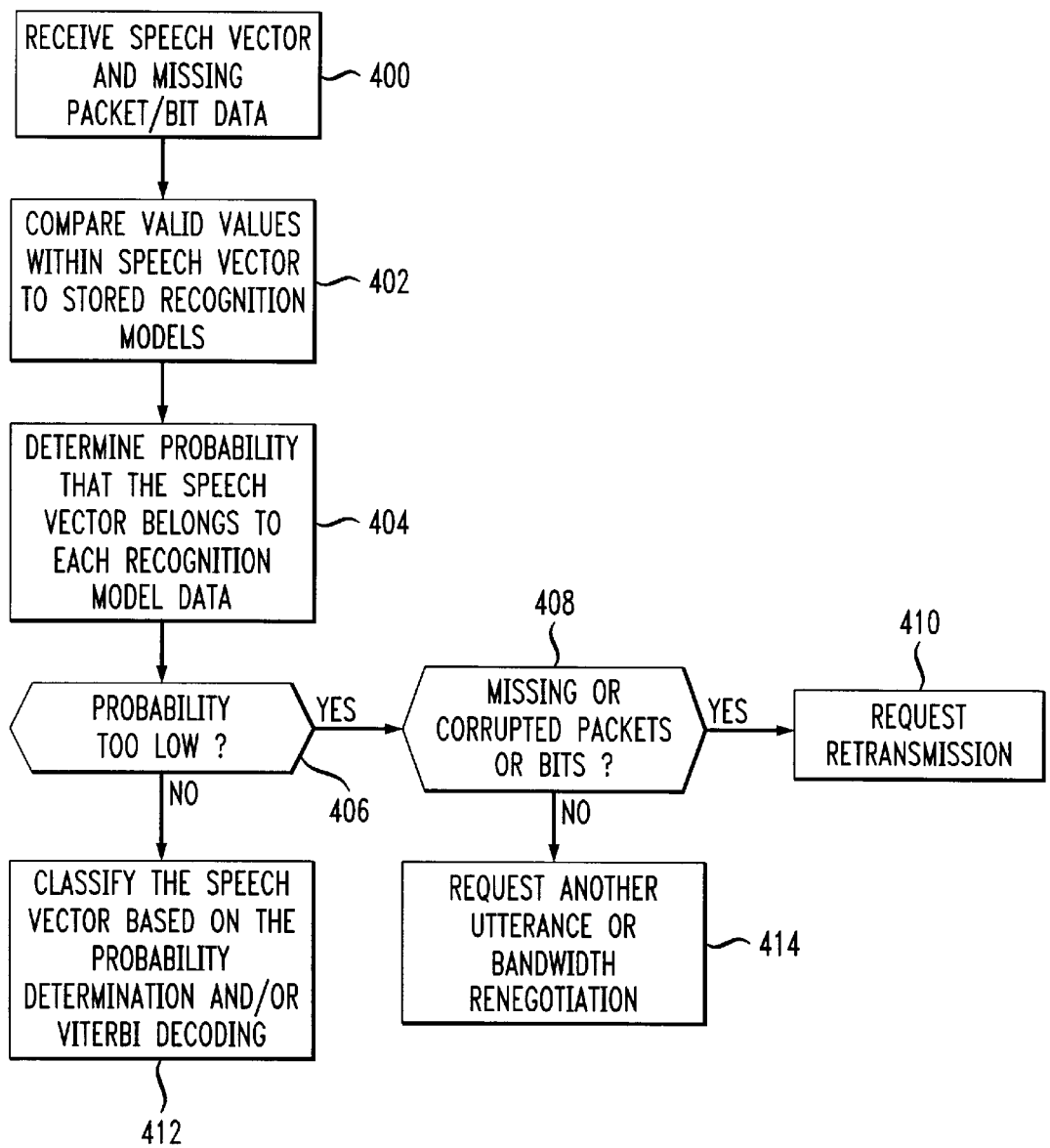
FIG. 6 depicts a method of recognizing speech according to the present invention.

In step 220 all of the data which has been received is combined into a speech vector. In step 222, the speech vector is sent to the speech recognizer 32. In addition, the buffering and decoding unit 26 sends data to the speech recognizer 32 indicating which features within the speech vector contain corrupted or likely to be corrupted data. An expanded view of the speech recognition method is shown in FIG. 6. In step 400, the speech recognition vector and missing packet data is received from the buffering and decoding unit 26. The speech vector is compared to stored recognition models contained within a data base 306 in step 402. Only valid values or features as indicated by the corruption data sent to the speech recognition unit 32 are used during the comparison with the stored recognition models. Based on the comparison step, a plurality (or lattice) of probabilities or distances are determined. The probabilities or distances indicate the likelihood that the speech vector belongs to each stored recognition model.

Steps 402 and 404 can be mathematically characterized as set forth below.

X is a feature vector representing speech (speech vector). X is a member of the set of real numbers of dimension "D," represented by the equation below.

$$X \in R^D$$

Assuming a single Gaussian distribution (although mixtures of Gaussian distributions could be used), the following equation characterizes the probability that a speech vector $X_t$ given state i belongs to a recognition model $\Lambda$. This is represented conventionally by:

$$P_{OLD}(X_t | State_i, \Lambda) = \frac{1}{(2\pi)^{\frac{D}{2}} \left(\prod_{i=1}^{D} \sigma_i^2\right)^{\frac{1}{2}}} \exp \sum_{i=1}^{D} \frac{(X_i - \mu_i)^2}{2\sigma_i^2}$$

where $\mu_i$, $\sigma_i$, are mean and variance.

When missing, corrupted or uncertain values are present within the speech vector X, for example, feature j then the likelihood can be computed using marginal distribution such that:

$$P_{NEW}(X_t | State_i, \Lambda) = \frac{1}{(2\pi)^{\frac{D}{2}} \left(\prod_{i=1 i \neq j}^{D} \sigma_i^2\right)^{\frac{1}{2}}} \exp \sum_{i=1 i \neq j}^{D} \frac{(X_i - \mu_i)^2}{2\sigma_i^2}$$

In step 406, the speech recognizer or a verification unit determines whether the speech classification stream produced from one or more received speech vectors has a score that exceeds a predetermined likelihood threshold. This is based on a likelihood ratio test typically performed in the verification unit 40, which may have its own speech verification models. If not, in step 408, the speech recognizer or verification unit determines whether or not there are missing or corrupted bits or features within the series of speech vectors. If so, in step 410, the speech recognizer or verification unit issues a request for retransmission which is carried out in step 136 in FIG. 2. If not, in step 414, the speech recognizer issues a request to the retransmission request unit 34 for the speaker to either make another speech utterance or for the retransmission request unit 34 to negotiate a higher bandwidth connection over the packetized transmission link. This latter step may ensure a more robust set of speech vectors for the speech recognizer 32 to operate on. If the likelihood that the speech classification stream correctly corresponds to the utterance which produced the speech signal exceeds the predetermined threshold in step 406, then in step 412, the speech recognizer classifies the speech vector based on the probability determination or likelihood score. In addition, the speech vectors may be classified based not only on probability but also on the language models and grammar models input to the Viterbi decoding unit.

Referring to FIG. 2, the output of the speech recognition step 132 is a stream of speech data shown in step 134. Offline analysis may be performed by a person as indicated by steps 142 and 144. In step 142, audio resynthesis parameters are turned into reconstructed speech. Then in step 144, a person compares the reconstructed speech with the speech recognition results in order to measure speech recognition performance.

In step 136, requests for retransmission of packets and corrupted data received from either of the buffering and decoding unit 26 or the speech recognizer 32 or the verification unit 40 are sent back over the packetized transmission link. This may result in a request to the packetization and buffering unit to simply resend the missing packet or corrupted data. Alternatively, it may result in a bandwidth renegotiation. This is shown in FIG. 2 by arrows leading from step 136 back to step 126 and step 120. Bandwidth renegotiation may be useful when the rate of packet loss and corrupted data is so high that speech recognition is rendered useless. Under these conditions, renegotiation may include more bandwidth being allocated, a more effective compression or encoding scheme, a more robust error correction scheme, or the use of principal components analysis and creating partially redundantly parallel data streams. According to the present invention, this bandwidth renegotiation may be done dynamically and largely transparent to a user. If the speech recognition fails, in step 138 the user is notified of the failure and is requested to make another speech utterance for recognition.

Although specific embodiments of the present invention have been set forth, one of ordinary skill in the art will appreciate that changes can be made to these embodiments without departing from the spirit and scope of the invention.

What is claimed is:

1. A method of recognizing a stream of speech received as a plurality of speech vectors over a lossy communications link, comprising the steps of:
   constructing for a speech recognizer a speech vector having a plurality of features derived from a plurality of packets received over a lossy communications link, wherein at least one of a plurality of packets associated with the speech vector are missing or corrupted;
   indicating to the speech recognizer missing or potentially corrupted features within the speech vector when present;
   attempting recognition at the speech recognizer of the speech vector when missing or potentially corrupted features are present; and
   requesting retransmission of a missing or corrupted packet when missing or potentially corrupted features are indicated by the indicating step and when the attempting recognition step fails.

2. The method according to claim 1, further comprising the steps of:
   requesting retransmission of the missing or corrupted packet prior to the constructing step.

3. The method according to claim 1, further comprising the steps of:
   requesting over the lossy communications link bandwidth renegotiation from a source of the plurality of packets.

4. The method according to claim 3, wherein the bandwidth renegotiation request includes a request to transmit packets in a compressed format.

5. The method according to claim 3, wherein the bandwidth renegotiation request includes a request to include error detection bits.

6. The method according to claim 3, wherein the bandwidth renegotiation request includes a request to include error correction bits.

7. The method according to claim 3, wherein the bandwidth renegotiation request includes a request to use principal components analysis.

8. The method according to claim 7, wherein the bandwidth renegotiation request further includes a request to create a partially redundant parallel data stream.

9. The method according to claim 1, further comprising the step of constructing a voice signal from audio resynthesis parameters received over the lossy communications link.

10. The method according to claim 9, wherein the voice signal is used by a person to measure performance of the speech recognizer.

11. A method of recognizing a stream of speech received as a plurality of speech vectors over a lossy communications link, comprising the steps of:
    receiving at a speech recognizer at least one speech vector and corruption data that identifies valid and potentially invalid features within each speech vector;
    comparing only the valid features within each speech vector to stored recognition models, each recognition model corresponding to a speech pattern;
    determining a plurality of probabilities based on the comparing step, that the speech vector belongs to each recognition model;
    classifying each speech vector as a speech or text segment corresponding to the recognition model based on the plurality of possibilities; and
    transmitting a request over the lossy communications link to resend at least one packet of the speech vector when the highest of the plurality of possibilities is below a predetermined threshold and the corruption data identifies potentially uncertain values within the speech vector.

12. The method according to claim 11, wherein the classifying step further comprises viterbi decoding based on at least one of a language model and a grammar model.

13. The method according to claim 11, wherein the classifying step further comprises classifying the speech vector as the speech or text segment corresponding to the recognition model with the highest probability.

14. The method according to claim 13, further comprising the step of:
    rejecting the classification made in the classifying step when the highest probability is less than a predetermined threshold.

15. The method according to claim 14, further comprising the step of:
    requesting retransmission of all or a portion of the speech vector when the corruption data identifies potentially invalid data within the speech vector.

16. The method according to claim 11, wherein the speech vector as originally transmitted includes at least two packets, and wherein one of the packets is lost during transmission over the communication link, further comprising the steps of:
    calculating the speech vector values from the at least one received packet and from an estimate of the values stored in the lost packet by performing interpolation on at least one of the at least one received packet.

17. The method according to claim 11, wherein the speech vector as originally transmitted includes at least two packets, and wherein one of the packets is lost during transmission over a communication link, further comprising the step of:
    transmitting a request over the lossy communications link for retransmission of the lost packet.

18. The method according to claim 11, wherein the speech vector is received in at least one packet over the lossy communication link, wherein at least one of the at least one packets includes corrupted bits, further comprising the step of:
    correcting the corrupted bits when error correcting bits are present.

19. The method according to claim 11, wherein the speech vector is received in at least one packet over the lossy communication link, wherein at least one of the at least one packets includes corrupted bits, further comprising the step of:

identifying the corrupted bits as the corruption data; and transmitting over the lossy communication link a request for retransmission of each packet that includes the corrupted bits.

20. The method according to claim 19, further comprising the step of:

waiting a predetermined time prior to transmitting the speech vector and corruption data to the speech recognizer.

21. The method according to claim 20, wherein the predetermined time is calculated based on the likelihood that a response to a request for retransmission of a packet that includes corrupted bits will be received prior to expiration of the predetermined time.

22. The method according to claim 11, wherein the speech vector is received in at least two packets over the lossy communications link, one of the packets being lost during transmission over the lossy communications link, and wherein the potentially invalid features correspond to the lost packet.

23. A system for recognizing a stream of speech received as a plurality of speech vectors over a lossy communications link, comprising:

a buffering and decoding unit coupled to a lossy communications link, receiving a plurality of packets, identifying missing or corrupted packets, and constructing a speech vector from the received packets, the speech vector having a plurality of certain features and uncertain features;

a speech recognizer coupled to the buffering and decoding unit, classifying the speech vector as one of a plurality of stored recognition models based on only the certain features within the speech vector; and a retransmission request unit coupled to the lossy communications link and the speech recognizer, the retransmission request unit for requesting retransmission of missing or corrupted packets when the speech recognizer is unable to classify the speech vector.

24. The system according to claim 23, further comprising:

the retransmission request unit being coupled to the buffering and decoding unit, the retransmission request unit requesting retransmission over the lossy communications link of the missing or corrupted packets identified by the buffering and decoding unit.

25. The system according to claim 23, further comprising:

the retransmission request unit being further coupled to the buffering and decoding unit, the retransmission request unit request retransmission of the missing or corrupted packets when missing or corrupted packets are indicated by the buffering and decoding unit and when the speech recognizer is unable to classify the speech vector.

26. The system according to claim 23, further comprising the retransmission request unit requesting over the lossy communications link bandwidth renegotiation from the source of the packets.

27. The system according to claim 26, wherein the bandwidth renegotiation request includes a request to include error protection bits.

28. The system according to claim 26, wherein the bandwidth renegotiation request includes a request to transmit packets in a compressed format.

29. The system according to claim 26, wherein the bandwidth renegotiation request includes a request to include error correction bits.

30. The system according to claim 26, wherein the bandwidth renegotiation request includes a request to use principal components analysis.

31. The system according to claim 30, wherein the bandwidth renegotiation request includes a request to create a partially redundant parallel data stream.

32. The system according to claim 23, further comprising constructing at the buffering and decoding unit a voice signal from audio resynthesis parameters received over the lossy communications link.

33. The system according to claim 23, further comprising correcting the corrupted packets at the buffering and decoding unit when error correcting bits are present.

34. The system according to claim 23, further comprising identifying the corrupted packets based on the presence of error protection bits within the corrupted packet.

35. The system according to claim 23, wherein the uncertain features correspond to the missing or corrupted packets.

* * * * *